US009841092B2

(12) United States Patent
Wenthen et al.

(10) Patent No.: US 9,841,092 B2
(45) Date of Patent: Dec. 12, 2017

(54) MULTI-SPEED TRANSAXLE FOR ELECTRIC AND HYBRID VEHICLE APPLICATION

(71) Applicant: Magna Powertrain, Inc., Concord (CA)

(72) Inventors: David W. Wenthen, Rochester Hills, MI (US); John R. Forsyth, Milford, MI (US)

(73) Assignee: MAGNA POWERTRAIN INC., Concord (CA)

( * ) Notice: Subject to any disclaimer, the term of this patent is extended or adjusted under 35 U.S.C. 154(b) by 85 days.

(21) Appl. No.: 15/086,345

(22) Filed: Mar. 31, 2016

(65) Prior Publication Data

US 2016/0208897 A1    Jul. 21, 2016

Related U.S. Application Data

(63) Continuation of application No. 13/996,774, filed as application No. PCT/US2011/064834 on Dec. 14, 2011, now Pat. No. 9,303,745.

(Continued)

(51) Int. Cl.
*B60K 17/08* (2006.01)
*F16H 37/08* (2006.01)
(Continued)

(52) U.S. Cl.
CPC .......... *F16H 37/0813* (2013.01); *B60K 1/00* (2013.01); *B60K 6/365* (2013.01); *B60K 6/52* (2013.01);
(Continued)

(58) Field of Classification Search
CPC ........ F16H 37/0813; F16H 3/725; F16H 3/44; F16H 37/082; F16H 2200/2094;
(Continued)

(56) References Cited

U.S. PATENT DOCUMENTS 4,418,777 A * 12/1983 Stockton ............. F16H 57/0413
180/65.6
4,799,158 A * 1/1989 Patil .................... F16H 61/0437
477/154

(Continued)

FOREIGN PATENT DOCUMENTS

DE   102009017066 A1   11/2009
WO   WO2010053745 A1 *  5/2010
WO   WO2010053745 A1    5/2010

*Primary Examiner* — Roger L Pang
(74) *Attorney, Agent, or Firm* — Dickinson Wright PLLC (57) ABSTRACT

An electric drive module for transferring torque to wheels of a motor vehicle a planetary gearset having a first member driven by the rotor and a second member. A synchronizer restricts a third member of the planetary gearset from rotation when the electric drive module operates at a first drive ratio. The synchronizer transfers energy from the rotating rotor to the third member during a shift between the first drive ratio and a second drive ratio to match the rotational speeds of the rotor and the second member. A reduction unit includes an input member being driven by the second member and also includes an output member driven at a reduced speed relative to the input member. A differential assembly includes an input driven by the output member, a first differential output driving a first output shaft, and a second differential output driving a second output shaft.

20 Claims, 6 Drawing Sheets

Related U.S. Application Data (60) Provisional application No. 61/426,856, filed on Dec. 23, 2010.

(51) Int. Cl.

| | | |
|---|---|---|
| *B60K 6/365* | (2007.10) | |
| *B60K 1/00* | (2006.01) | |
| *F16H 3/54* | (2006.01) | |
| *F16H 3/44* | (2006.01) | |
| *B60K 6/52* | (2007.10) | |
| *B60K 17/356* | (2006.01) | |
| *F16H 3/72* | (2006.01) | |
| *F16H 37/04* | (2006.01) | |
| *B60K 6/54* | (2007.10) | |
| *B60K 17/16* | (2006.01) | |

(52) U.S. Cl.
CPC ............ *B60K 17/08* (2013.01); *B60K 17/356* (2013.01); *F16H 3/44* (2013.01); *F16H 3/54* (2013.01); *F16H 3/725* (2013.01); *F16H 37/082* (2013.01); *B60K 6/54* (2013.01); *B60K 17/165* (2013.01); *B60K 2001/001* (2013.01); *B60Y 2200/92* (2013.01); *F16H 2037/047* (2013.01); *F16H 2200/0017* (2013.01); *F16H 2200/0021* (2013.01); *F16H 2200/2094* (2013.01); *Y10S 903/91* (2013.01); *Y10S 903/916* (2013.01)

(58) Field of Classification Search
CPC ....... F16H 2037/047; F16H 2200/0017; F16H 2200/0021; B60K 17/356; B60K 6/52; B60K 6/365; B60K 17/165; Y10S 903/916; Y10S 903/91; B60Y 2200/92
USPC .......................... 475/5, 200, 204, 206, 150
See application file for complete search history.

(56) References Cited

U.S. PATENT DOCUMENTS

| | | |
|---|---|---|
| 5,285,111 A | 2/1994 | Sherman |
| 6,093,974 A * | 7/2000 | Tabata ................. B60K 6/365 180/65.25 |
| 6,383,114 B1 | 5/2002 | Hoshiya et al. |
| 6,602,159 B1 | 8/2003 | Williams |
| 6,830,526 B2 | 12/2004 | Stettler, Jr. |
| 7,172,528 B2 | 2/2007 | Yu et al. |
| 7,384,366 B2 | 6/2008 | Kelley, Jr. |
| 8,479,851 B2 | 7/2013 | Mack et al. |
| 8,876,643 B2 * | 11/2014 | Fickel ...................... F16H 3/54 180/65.235 |
| 9,062,744 B2 * | 6/2015 | Valente ..................... F16H 3/54 |
| 2004/0110593 A1 | 6/2004 | Szalony et al. |
| 2006/0270519 A1 | 11/2006 | Kamada et al. |
| 2008/0300101 A1 * | 12/2008 | Jarzyna ............. B60K 17/3467 477/35 |
| 2009/0127954 A1 * | 5/2009 | Mogi ..................... B60K 17/12 310/90 |
| 2011/0195812 A1 | 8/2011 | Burke et al. |
| 2011/0218070 A1 | 9/2011 | Mack et al. |

\* cited by examiner

MULTI-SPEED TRANSAXLE FOR ELECTRIC AND HYBRID VEHICLE APPLICATION

CROSS-REFERENCE TO RELATED APPLICATIONS

This application is a continuation of U.S. patent application Ser. No. 13/996,774 filed on Nov. 4, 2013, which claims priority to International Application No. PCT/US2011/064834 filed Dec. 14, 2011 and which claims the benefit of U.S. Provisional Application No. 61/426,856, filed Dec. 23, 2010. The entire disclosure of each of the above applications is incorporated herein by reference.

FIELD

The present disclosure relates to electric drive systems for motor vehicles. More specifically, the present disclosure relates to a two-speed electric drive module for electric and hybrid vehicles.

BACKGROUND

Automobile manufacturers are actively working to develop alternative powertrain systems in an effort to reduce the level of pollutants exhausted into the air by conventional vehicles equipped with internal combustion engines. Significant development has been directed to electric vehicles and fuel cell vehicles. These alternative powertrain systems are still under development. In addition, several different hybrid electric vehicles have recently been offered for sale. These hybrid vehicles are typically equipped with an internal combustion engine and an electric motor that can be operated independently or in combination to drive the vehicle.

There are two common types of hybrid vehicles, namely, series hybrid and parallel hybrid. In a series hybrid vehicle, power is delivered to the wheels by the electric motor which draws electrical energy from the battery. The engine is used in series hybrid vehicles to drive a generator which supplies power directly to the electric motor or charges the battery when the state of charge falls below a predetermined value. In parallel hybrid vehicles, the electric motor and the engine can be operated independently or in combination pursuant to the running conditions of the vehicle. Typically, the control strategy for such parallel hybrid vehicles defines a low-load mode where only the electric motor is used to drive the vehicle, a high-load mode where only the engine is used to drive the vehicle, and an intermediate assist mode where the engine and electric motor are both used to drive the vehicle. Regardless of the type of hybrid drive system used, hybrid vehicles are highly modified versions of conventional vehicles that are expensive due to the componentry, required control systems, and specialized packaging requirements.

Hybrid powertrains have also been adapted for use in four-wheel drive vehicles and typically utilize the above-noted parallel hybrid powertrain to drive the primary wheels and a second electric motor to drive the secondary wheels. Obviously, such a four-wheel drive system is extremely expensive and difficult to package. Thus, a need exists to develop solely electrically powered or hybrid powertrains for use in various types of vehicles.

SUMMARY

An electric drive module for transferring torque to wheels of a motor vehicle a planetary gearset having a first member driven by the rotor and a second member. A synchronizer restricts a third member of the planetary gearset from rotation when the electric drive module operates at a first drive ratio. The synchronizer transfers energy from the rotating rotor to the third member during a shift between the first drive ratio and a second drive ratio to match the rotational speeds of the rotor and the second member. A reduction unit includes an input member being driven by the second member and also includes an output member driven at a reduced speed relative to the input member. A differential assembly includes an input driven by the output member, a first differential output driving a first output shaft, and a second differential output driving a second output shaft.

An electric drive module for transferring torque to wheels of a motor vehicle includes an electric motor having a rotatable rotor. A first input member is driven by the rotor. A two-speed module drivingly interconnects the first input member and a first output member at one of two different drive ratios. The two-speed module includes a planetary gearset and a synchronizer. The synchronizer restricts one member of the planetary gearset from rotation when the two-speed module operates at a first drive ratio. The synchronizer transfers energy from the rotating rotor during a shift between the first drive ratio and a second drive ratio to match the rotational speeds of the rotor and the first output member. A reduction unit includes a second input member being driven by the first output member and further includes a second output member being driven at a reduced speed relative to the second input member. A differential assembly has an input driven by said second output member, a first differential output driving a first output shaft, and a second differential output driving a second output shaft.

Further areas of applicability of the present disclosure will become apparent from the detailed description provided hereinafter. However, it should be understood that the detailed description and specific examples, while indicating preferred embodiments of the present disclosure, are intended for purposes of illustration only since various changes and modifications within the fair scope of this particular disclosure will become apparent to those skilled in the art.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The present disclosure is related to an electric drive module assembly including an electric motor. The electric drive module is electrically-controlled for delivering motive power (i.e., drive torque) to a pair of ground-engaging wheels. The compact arrangement of the electric motor and a two-speed gearbox permits the use of the electric drive module in substitution for a conventional axle assembly. As such, conventional rear-wheel drive and front-wheel drive powertrains can be used in combination with the electric drive module so as to establish a hybrid drive system for a four-wheel drive vehicle. Alternatively, the electric drive module may be used in vehicles powered solely by batteries as well. Accordingly, various features and functional characteristics of the electric drive module will be set forth below in a manner permitting those skilled in relevant arts to fully comprehend and appreciate the significant advantages the present disclosure provides.

Figure 1:
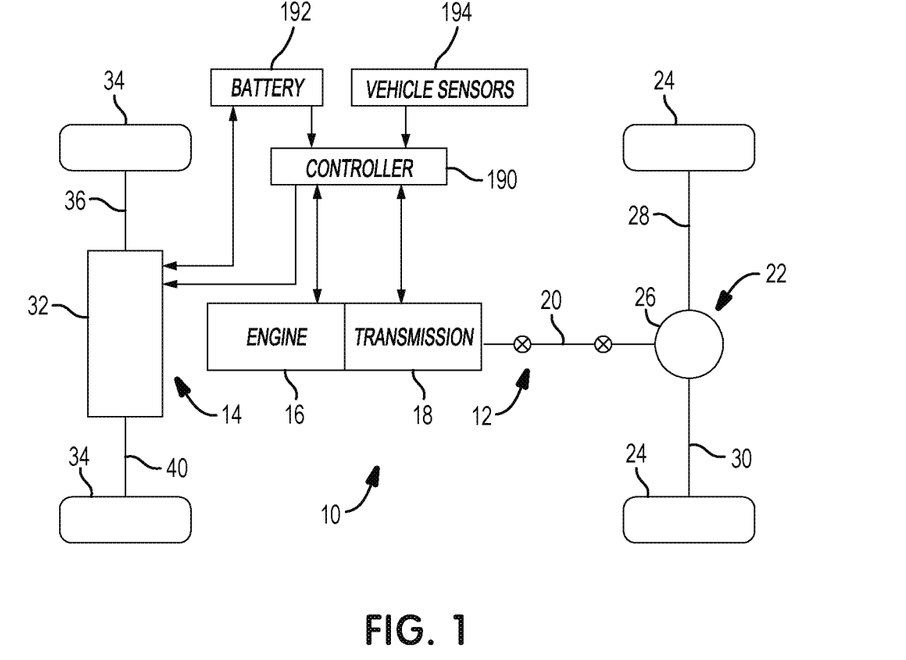
FIG. 1 is a schematic view showing a hybrid powertrain for a four-wheel drive vehicle in accordance with the present disclosure.

Referring to FIG. 1, a four-wheel drive powertrain for a hybrid electric vehicle 10 is shown to include a first powered driveline 12 and a second powered driveline 14. First powered driveline 12 includes an internal combustion engine 16, a transmission 18, a drive shaft 20, and an axle assembly 22 connecting a pair of wheels 24. Engine power is delivered to a differential unit 26 associated with axle assembly 22 through transmission 18 and drive shaft 20. The drive torque delivered to differential unit 26 is transferred through axleshafts 28 and 30 to wheels 24. Second powered driveline 14 includes an electric drive module 32 which drives a second pair of wheels 34 through axleshafts 36 and 40.

Figure 2:
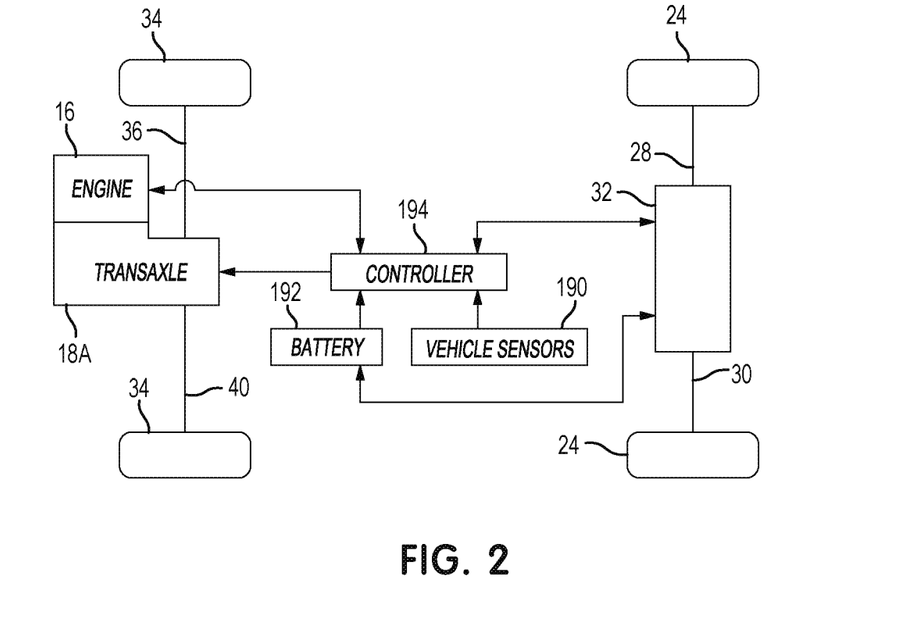
FIG. 2 is a schematic view of an alternative arrangement for the hybrid powertrain of the present disclosure.

In the particular layout shown in FIG. 1, first powered driveline 12 delivers power to rear wheels 24 while second powered driveline 14 delivers power to front wheels 34. Obviously, those skilled in the art would understand that the opposite powertrain arrangement can be utilized such that electric drive module 32 supplies power to the rear wheels. To better illustrate this arrangement, FIG. 2 shows module 32 supplying power to rear wheels 24 through axleshafts 28 and 30 while engine power is supplied to front wheels 34 through a transaxle 18A and axleshafts 36 and 40. Regardless of the particular arrangement, hybrid vehicle 10 includes two distinct powered drivelines capable of both independent and combined operation to drive the vehicle.

Figure 3:
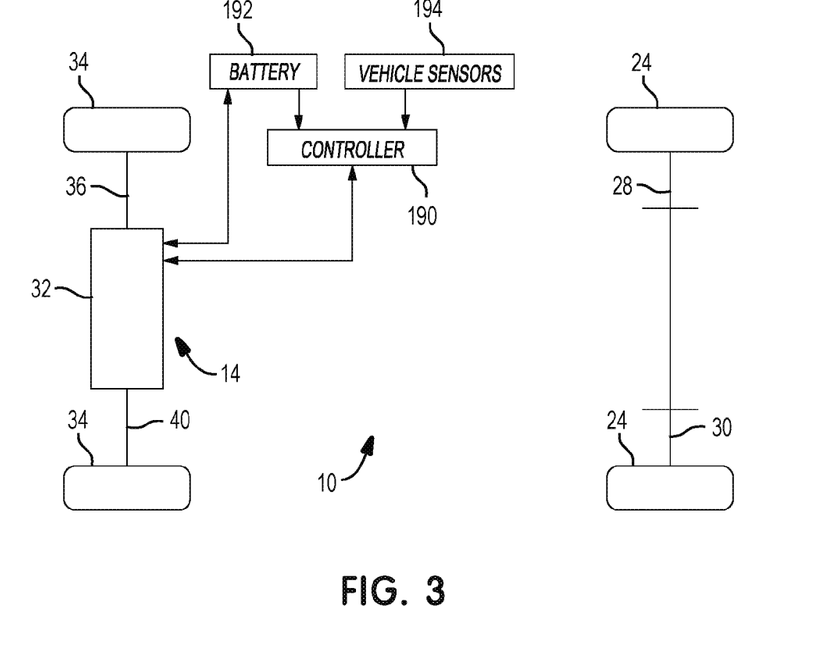
FIG. 3 is a schematic view of an alternative arrangement electric powertrain of the present disclosure.

As shown in FIG. 3, it is also contemplated that electric drive module 32 may be the sole source of motive power for vehicle 10. An internal combustion engine would not be present. Accordingly, front wheels 34 receive torque through axleshafts 36 and 40 provided by electric drive module 32.

Figure 4:
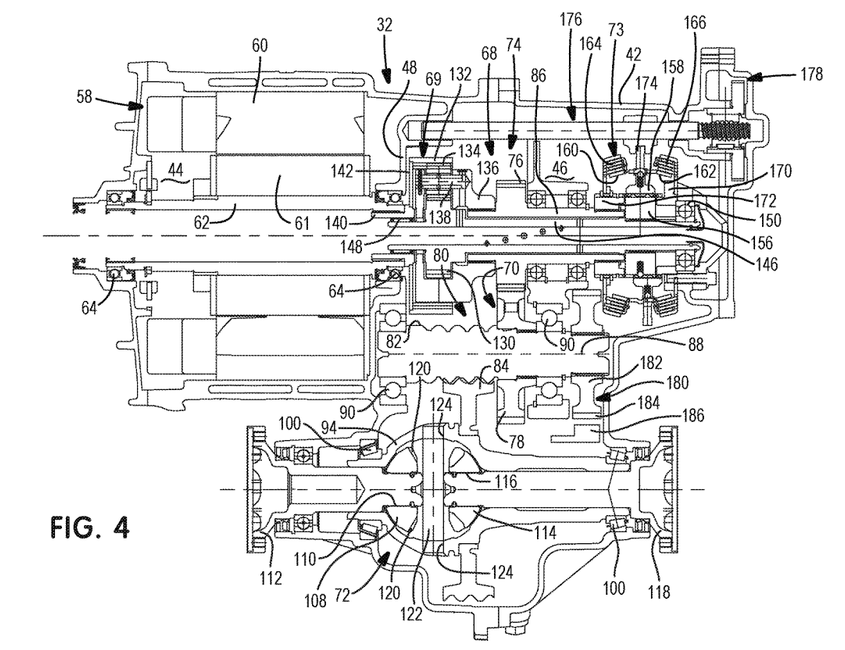
FIG. 4 is a sectional view of an electric drive module associated with the powertrains of FIGS. 1-3.

Referring now to FIG. 4, electric drive module 32 will be described in detail. Electric drive module 32 includes a multi-section housing assembly 42 defining a motor chamber 44 and a gearbox chamber 46 separated by a radial support wall 48. Electric drive module 32 is depicted as a two-speed transaxle. An electric variable speed motor assembly 58 is located within motor chamber 44 and includes a wound stator 60 secured to housing assembly 42 and a rotatable rotor 61. An elongated tubular rotor shaft 62 is supported at its opposite ends by bearing assemblies 64 for rotation relative to housing assembly 42. Rotor 61 is fixed for rotation with rotor shaft 62.

Electric drive module 32 further includes a gearbox 68 located within gearbox chamber 46 and which is comprised of planetary gearset 69, a reduction unit 70 and a bevel differential 72. A synchronizer assembly 73 is associated with both planetary gearset 69 and reduction unit 70. Reduction unit 70 includes a first reduction gearset 74 having a first drive gear 76 in constant meshed engagement with a first driven gear 78 as well as a second reduction gearset 80 having a second drive gear 82 in constant meshed engagement with a second driven gear 84. First drive gear 76 is fixed for rotation with a transfer shaft 86. First driven gear 78 and second drive gear 82 are fixed for rotation with an intermediate shaft 88 rotatably supported by bearings 90. Second driven gear 84 is fixed to a casing 94 of bevel differential 72.

Bevel differential 72 includes a pair of bearings 100 rotatably supporting bell-shaped casing 94. Bevel differential 72 further includes a first side gear 108 fixed via a spline connection 110 to a first output shaft 112, a second side gear 114 fixed via a spline connection 116 to a second output shaft 118, and at least one pair of pinions 120 meshed with side gears 108 and 114. Pinions 120 are rotatably supported on a pinion shaft 122 having its opposite ends located in polar apertures 124 formed in casing 94.

Planetary gearset 69 includes a sun gear 130, an annulus gear 132, and a plurality of pinion gears 134 positioned in constant meshed engagement with sun gear 130 and annulus gear 132. A carrier 136 includes pinion shafts 138 rotatably supporting pinion gears 134. Annulus gear 132 is fixed for rotation with rotor shaft 62 via a splined coupler 140 and a plate 142. Sun gear 130 is integrally formed with a hollow input shaft 146. Hollow input shaft 146 passes through hollow transfer shaft 86 and synchronizer assembly 73. Bearings 148, 150 rotatably support input shaft 146. Carrier 136 is fixed for rotation via splined engagement with transfer shaft 86 and first drive gear 76.

Synchronizer assembly 73 includes a hub 156 fixed for rotation with input shaft 146. Synchronizer assembly 73 includes a shift sleeve 158 mounted for rotation with hub 156 by means of an externally splined surface being in sliding meshed engagement with an internal spline surface of sleeve 158. Synchronizer assembly 73 also includes blocker rings 160, 162, cone rings 164, 166, a first drive member 170 and a second drive member 172. A shift fork 174 cooperates with shift sleeve 158 to axially translate shift sleeve 158 between a first position drivingly engaged with first member 170, a neutral position as shown in upper portion of FIG. 1, and a second position drivingly engaged with second member 172. First member 170 is fixed to housing assembly 42 and is restricted from rotation. Second member 172 is fixed for rotation with transfer shaft 86.

A shift mechanism 176 includes an actuator 178 operable to axially translate shift fork 174. Actuator 178 may include any number of components including linear feed screw arrangements, electric motors, hydraulic motors, cams, ball ramp actuators and the like.

A parking pawl assembly 180 is provided to selectively ground a parking gear 182 fixed for rotation with intermediate shaft 88 to housing assembly 42. Parking gear 182 includes a plurality of teeth 184 selectively engageable with a parking pawl 186. When parking pawl 186 is engaged with teeth 184, rotation of the components within reduction unit 70 is restricted. Accordingly, movement of vehicle 10 is also restricted. Parking pawl 186 may be rotated to become engaged and disengaged from teeth 184. When parking pawl 186 is disengaged from teeth 184, the components within reduction unit 70 may rotate as previously described.

In accordance with a use of electric drive module 32, output shafts 112 and 118 are adapted to be connected to corresponding ones of front axleshafts 36 and 40 for the hybrid powertrain arrangement shown in FIG. 1 or, alternatively, to corresponding ones of rear axleshafts 28 and 30 for the powertrain arrangement shown in FIG. 2. In this manner, electric drive module 32 functions as an electrically-powered axle assembly which can be controlled independently, or in combination with, the engine-based powertrain.

Two-speed gearbox 68 includes planetary gearset 69 and synchronizer assembly 73 acting in cooperation with one another to selectively provide one of a first gear ratio (low) and a second gear ratio (high) between rotor shaft 62 and transfer shaft 86. Actuator 178 axially translates shift fork 174 and shift sleeve 158 to a right-most position when viewed in FIG. 4 where hub 156 is fixed for rotation with first member 170 via shift sleeve 158 as shown in the lower portion of FIG. 4. At this first or low position, hub 156, input shaft 146 and sun gear 130 are restricted from rotation. Input torque provided by electric motor assembly 58 is transferred through rotor shaft 62 and input to annulus gear 132. Carrier 136 acts as the output rotating at a reduced speed relative to rotor shaft 62. Because electric drive module 32 is only operable in two different drive ratios, the low gear ratio is significantly spaced apart from the high gear ratio. To achieve desirable vehicle performance, rotor 61 and rotor shaft 62 rotate at relatively high rotational speeds immediately prior to shifting from the low gear range to the high gear range.

During the shift, a significant challenge exists regarding reducing the rotational speed of rotor 61 and rotor shaft 62 due to the relatively high inertia of these members. At the same time, sun gear 130, input shaft 146 and hub 156 are accelerated from a zero rotational speed to the new desired rotor shaft speed. Furthermore, care must be taken to maintain the rotational speed of carrier 136 and the downstream components of reduction unit 70 to allow the vehicle wheels to rotate at the same speed before and after the gear shift.

Synchronizer assembly 73 and planetary gearset 69 cooperate with one another to exert a mechanical advantage on rotor shaft 62 and rotor 61 during the shift from the first gear ratio to the second gear ratio. More particularly, actuator 178 axially translates shift sleeve 158 to the neutral position shown at the top portion of FIG. 4 to free sun gear 130 for rotation. Actuator 178 continues to axially translate shift sleeve 158 toward the left to frictionally engage cone clutch portions of blocker ring 160 and cone ring 164. At this time, torque is transferred through second member 172 to carrier 136. Carrier 136 now acts as the input member of planetary gearset 69 and annulus gear 132 acts as the output member. A mechanical advantage is provided to reduce the speed of rotor shaft 62. Once the speeds of annulus gear 132 and sun gear 130 are substantially matched, blocker ring 160 rotates to allow shift sleeve 158 to fully axially translate to the left and rotationally fix hub 156 for rotation with second member 172. At this time, sun gear 130 and annulus gear 132 are also fixed for rotation with one another. Planetary gearset 69 is locked such that a direct drive or 1:1 ratio is provided from rotor shaft 62 to transfer shaft 86. Electric drive module 32 now operates in the second gear ratio.

As shown in FIGS. 1-3, a controller 190 is in communication with a battery 192, vehicle sensors 194, electric drive module 32 as well as the engine and transmission, if present. Concurrent control of engine 16, transmission 18 and electric drive module 32 is described in issued U.S. Pat. Nos. 6,595,308 and 6,604,591, which are herein incorporated by reference.

In relation to the two-speed arrangement, controller 190 is operable to control shift mechanism 176 and execute an upshift from LOW to HIGH or a downshift from HIGH to LOW, as desired. Controller 190 may also place electric drive module 32 in a regeneration mode such that energy from vehicle 10 may be used to charge battery 192 during a vehicle descent or braking event.

Figure 5:
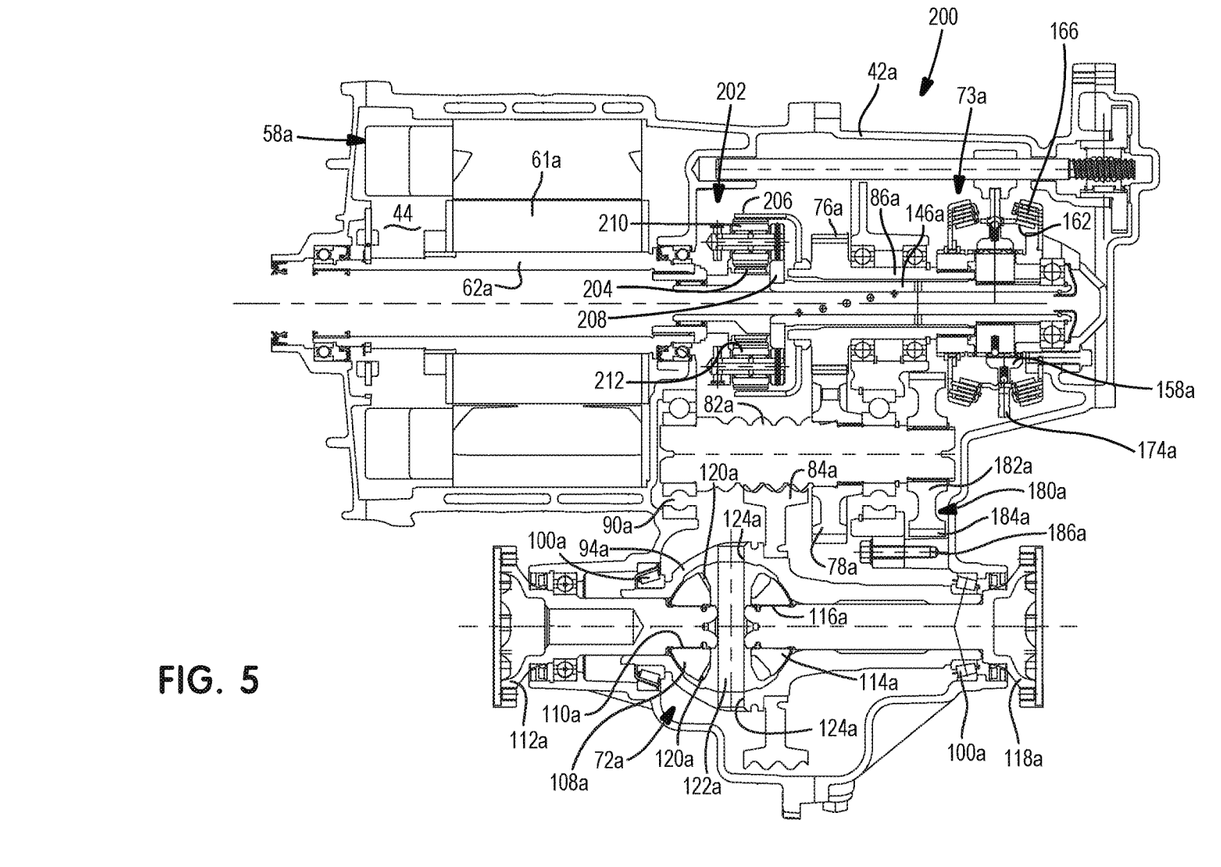
FIG. 5 is a sectional view of an alternate electric drive module.
Figure 6:
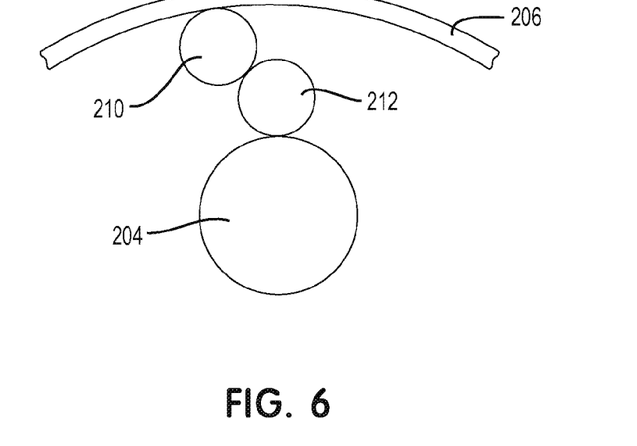
FIG. 6 is a fragmentary end view of a compound planetary gearset of the electric drive module shown in FIG. 5.

FIGS. 5 and 6 depict another electric drive module identified at reference numeral 200. Electric drive module 200 is substantially similar to electric drive module 32. As such, similar elements will be identified with like reference numerals including a lower "a" suffix. The main difference between electric module 200 and electric drive module 32 relates to a planetary gearset 202 replacing planetary gearset 69. Planetary gearset 202 is configured as a dual-planet star epicyclic gearset where planetary gearset 69 is arranged as a solar epicyclic arrangement. Planetary gearset 202 includes a sun gear 204 fixed for rotation with rotor shaft 62a. An annulus gear 206 is fixed for rotation with transfer shaft 86a. A carrier 208 is fixed for rotation with input shaft 146a. Planetary gearset 202 includes first planet gears 210 circumferentially spaced apart from one another and in constant meshed engagement with annulus gear 206. First planet gears 210 are spaced apart from sun gear 204. Second planet gears 212 are circumferentially spaced apart from one another and meshingly engaged with both sun gear 204 and a respective one of first planet gears 210. Second planet gears 212 do not engage annulus gear 206. The remaining components of electric drive module 200 are substantially similar to those previously described in relation to electric drive module 32.

During operation of electric drive module 200, low gear may be provided by translating shift fork 174a and shift sleeve 158a to the right to restrict rotation of input shaft 146a and carrier 208. Drive torque is provided from motor assembly 58a through rotor shaft 62a to the input or sun gear 204 of planetary gearset 202. Annulus gear 206 functions as the output and provides multiplied torque to transfer shaft 86a. In the shift from first gear to second gear, synchronizer assembly 73a decreases the rotational speed of rotor shaft 62a and increases the speed of input shaft 146a and carrier 308 until the speeds are matched and the 1-2 shift may be completed.

Figure 7:
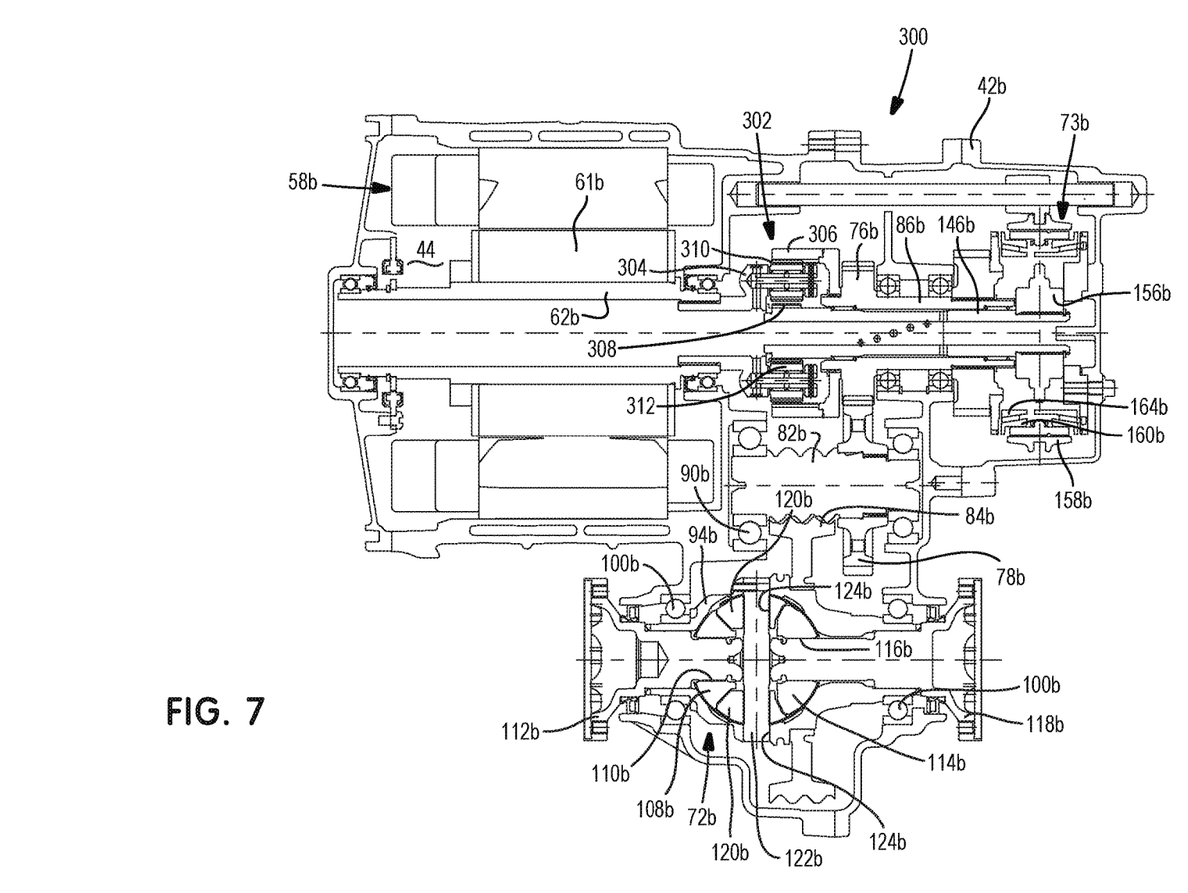
FIG. 7 is sectional view of another alternate electric drive module.

FIG. 7 depicts another alternate electric drive module identified at reference numeral 300. Electric drive module 300 is substantially similar to electric drive modules 32 and 200. Accordingly, similar elements will be identified with like reference numerals including a "b" suffix. Electric drive module 300 includes a planetary gearset 302 differing from the planetary gearsets previously described. In particular, planetary gearset 302 is a dual-planet inverted solar arrangement. A carrier 304 is fixed for rotation with rotor shaft 62b. An annulus gear 306 is fixed for rotation with transfer shaft 86b. A sun gear 308 is integrally formed with input shaft 146b. First planet gears 310 are meshingly engaged with annulus gear 306 and spaced apart from sun gear 308. Second planet gears 312 are meshingly engaged with first planet gears 310 and sun gear 308. Second planet gears 312 are spaced apart from annulus gear 306.

A first low gear is provided by grounding sun gear 306 and input shaft 146b to housing assembly 42b via synchronizer 73b. As with the earlier embodiments previously described, this accomplished by axially translating shift sleeve 158b to the right as shown in FIG. 7. Input torque is transferred from rotor shaft 62b to carrier 304. A reduced speed output is provided from annulus gear 306 to transfer shaft 86b.

During a shift from low gear to high gear, synchronizer 73b is actuated causing shift sleeve 158b to translate to the left and frictionally engage blocker ring 160b and cone ring 164b. Energy is transferred between the high inertia rotating mass of rotor 61b and the previously stationary mass of hub 156b, input shaft 146b and sun gear 308 via planetary gearset 302. Planetary gearset 302 is arranged such that a mechanical advantage is provided to synchronizer 73b during the shift from low gear to high gear. During the shift, the input is sun gear 308 and carrier 304 is the output as planetary gearset 302 functions to reduce the speed of rotor shaft 62b and rotor 61b. Once the rotational speeds of rotor shaft 62b and carrier 304 match the rotational speed of sun gear 308 and input shaft 146b, shift sleeve 158b may be axially translated to the left to provide the second gear ratio.

Figure 8:
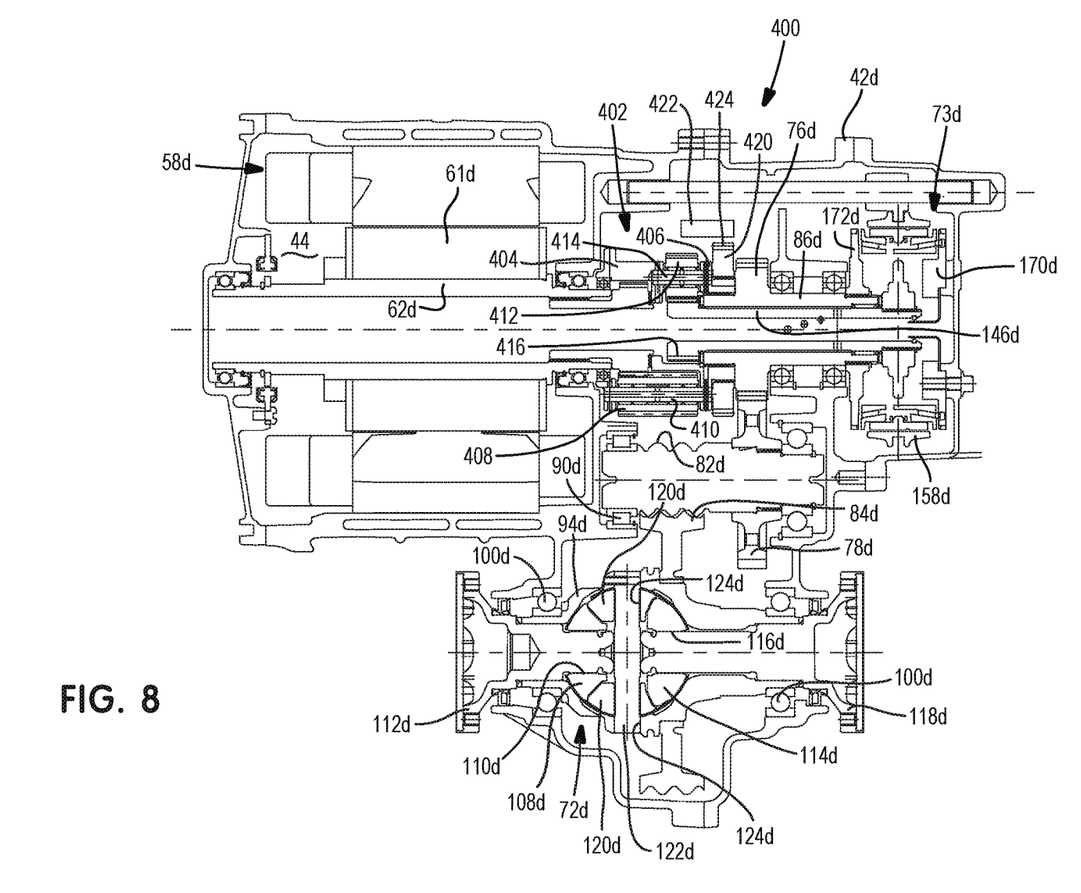
FIG. 8 is a sectional view of another alternate electric drive module.

FIG. 8 depicts another alternate electric drive module identified at reference numeral 400. Electric drive module 400 is substantially similar to the previously described drive modules and similar elements will be identified with like numerals having a "d" suffix. Electric drive module 400 includes a planetary gearset 402 arranged as a dual-sun, dual-planet epicyclic configuration. Planetary gearset 402 includes a first sun gear 404 fixed for rotation with rotor shaft 62d. A carrier 406 is fixed for rotation with transfer shaft 86d. First pinions 408 are rotatably supported on first pins 410. Each of first pinions 408 is meshingly engaged with first sun gear 404. Second pinions 412 are rotatably supported on second pins 414. Second pinions 412 are meshingly engaged with first pinions 408 and a second sun gear 416. Second sun gear is fixed for rotation with input shaft 146d. First pinions 408 are substantially longer than second pinions 412 to axially extend a distance to simultaneously engage first sun gear 404 and second pinions 412. In the dual-sun, dual-planet epicyclic gearset depicted, an annulus gear is not present.

Second sun gear 416 is restricted from rotation when shift sleeve 158d is in the rightmost position. Torque is provided from electric motor assembly 58d through rotor shaft 62d to first sun gear 404. Planetary gearset 402 outputs torque through carrier 406 to transfer shaft 86d.

During a shift from low gear to high gear, second sun gear 416 functions as the input of planetary gearset 402 while first sun gear 404 functions as the output. As such, synchronizer 73d is provided a mechanical advantage equal to the gear ratio provided by planetary gearset 402 when operated in this manner. The relatively high inertia rotor 61d rotating at a relatively high speed may be rapidly decelerated to match the rotational speed of input shaft 146d. Shift sleeve 158 is transferred to the left to provide the second gear ratio.

Electric drive module 400 further differs from those previously described in that a park gear 420 is fixed for rotation with transfer shaft 86d. A park pawl 422 may be positioned in selective engagement with teeth 424 formed on parking gear 420 to restrict the members of reduction unit 70d and first and second output shafts 112d, 118d.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electric drive module for transmitting torque to first and second wheels of an electric or hybrid motor vehicle, comprising:
    a housing defining a motor chamber and a gearbox chamber;
    an electric motor disposed in the motor chamber and including a rotor shaft;
    a gearbox disposed in the gearbox chamber and including a planetary gearset, a reduction unit, a clutch assembly, and a differential assembly, the differential assembly including a differential input, a first differential output driving the first wheel, a second differential output driving the second wheel, and a differential gearset drivingly connecting the differential input to the first and second differential outputs, the reduction unit including a first transfer shaft, a second transfer shaft, a first reduction gearset connected between the first and second transfer shafts, and a second reduction gearset connected between the second transfer shaft and the differential input, the planetary gearset including a first member connected for rotation with the rotor shaft, a second member connected for rotation with the first transfer shaft, and a third member, the clutch assembly being operable in a first mode to brake rotation of the third member of the planetary gearset for establishing a first drive ratio connection between the rotor shaft and the first transfer shaft and being operable in a second mode to couple the second and third members of the planetary gearset for establishing a second drive ratio connection between the rotor shaft and the first transfer shaft; and
    a power-operated shift mechanism for shifting the clutch assembly between the first and second modes,
    wherein shifting of the clutch assembly from the first mode into the second mode initially causes the second and third members of the planetary gearset to accelerate and initially causes the first member of the planetary gearset to decelerate so as to match the rotational speeds of the rotor shaft and the first transfer shaft.

2. The electric drive module of claim 1 wherein the rotor shaft, the planetary gearset, the first transfer shaft and the clutch assembly are arranged along a first rotary axis, and wherein the first transfer gearset is disposed between the planetary gearset and the clutch assembly along the first rotary axis.

3. The electric drive module of claim 2 wherein the differential assembly is arranged along a second rotary axis and the second transfer shaft is arranged along a third rotary axis, and wherein the third rotary axis is disposed between the first and second rotary axes.

4. The electric drive module of claim 3 wherein the gearbox further comprises an input shaft rotatable about the first rotary axis and which is connected for rotation with the third member of the planetary gearset, wherein the clutch assembly is operably disposed between the input shaft and the first transfer shaft, and wherein the first drive ratio connection is established by the clutch assembly braking rotation of the input shaft when shifted into the first mode and the second drive ratio connection is established by the clutch assembly coupling the input shaft to the first transfer shaft when shifted into the second mode.

5. The electric drive module of claim 4 wherein the clutch assembly includes a shift sleeve driven by the input shaft and which is moveable between first and second mode positions, a first clutch member fixed to the housing, and a second clutch member fixed to the first transfer shaft, wherein the power-operated shift mechanism is operable to move the shift sleeve between the first and second mode positions, wherein the shift sleeve is operable in the first mode position to couple the input shaft to the first clutch member and is operable in the second mode position to couple the input shaft to the second clutch member, and wherein the shift sleeve can further be located in a third mode position whereat the shift sleeve is disengaged from both of the first and second clutch members.

6. The electric drive module of claim 5 wherein the clutch assembly further includes a first speed synchronizer disposed between the shift sleeve and the first clutch member and which is configured to decelerate rotation of the input shaft when the clutch assembly is shifted into the first mode by moving the shift sleeve from the third mode position into the first mode position, and a second speed synchronizer disposed between the shift sleeve and the second clutch member and which is configured to accelerate rotation of the input shaft when the clutch assembly is shifted into the second mode by moving the shift sleeve from the third mode position into the second mode position.

7. The electric drive module of claim 6 wherein the planetary gearset provides a mechanical advantage to the second synchronizer during shifting of the clutch assembly from the first mode into the second mode to assist in decelerating the rotor shaft.

8. The electric drive module of claim 4 wherein the planetary gearset includes a ring gear acting as the first member, a carrier acting as the second member, and a sun gear acting as the third member, and wherein the planetary gearset further includes pinion gears supported by the carrier and drivingly interconnecting the ring gear and the sun gear.

9. The electric drive module of claim 4 wherein the planetary gearset includes a sun gear acting as the first member, a ring gear acting as the second member, and a carrier acting as the third member, and wherein the planetary gearset further includes pinion gears rotatably supported by the carrier and meshed with the ring gear and the sun gear.

10. The electric drive module of claim 4 wherein the planetary gearset includes a carrier acting as the first member, a ring gear acting as the second member, and a sun gear acting as the third member, and wherein the planetary gearset further includes pinion gears rotatably supported by the carrier and drivingly connecting the ring gear and the sun gear.

11. The electric drive module of claim 1 wherein the clutch assembly includes a first clutch member fixed to the housing, a second clutch member fixed to the first transfer shaft, and a shift sleeve connected to the third member of the planetary gearset and moveable from a non-engaged position into a first engaged position and from the non-engaged position into a second engaged position, wherein the shift sleeve is operable in the first engaged position to couple the third member of the planetary gearset to the first clutch member and establish the first mode, and wherein the shift sleeve is operable in the second engaged position to couple the third member of the planetary gearset to the first transfer shaft and establish the second mode.

12. The electric drive module of claim 11 wherein the clutch assembly further comprises a first synchronizer disposed between the shift sleeve and the first clutch member and a second synchronizer disposed between the shift sleeve and the second clutch member, wherein the first synchronizer is configured to decelerate the third member of the planetary gearset in response to movement of the shift sleeve from the non-engaged position into the first engaged position, and wherein the second synchronizer is configured to accelerate the third member of the planetary gearset and the first transfer shaft in response to movement of the shift sleeve from the non-engaged position into the second engaged position.

13. An electric drive axle for driving first and second wheels in a motor vehicle, comprising:
  a housing defining a motor chamber and a gearbox chamber;
  an electric motor disposed in the motor chamber and having a rotor shaft;
  a two-speed gearbox disposed in the gearbox chamber and including a differential assembly, a reduction unit, a planetary gearset and a clutch assembly, the differential assembly including a differential case, a first differential output driving the first wheel, a second differential output driving the second wheel, and a differential gearset drivingly connecting the differential case to the first and second differential outputs, the reduction unit including a transfer shaft and a reduction gearset providing a speed reduction connection between the transfer shaft and the differential case, the planetary gearset including a first member fixed for rotation with the rotor shaft, a second member fixed for rotation with the transfer shaft, and a third member, the clutch assembly including a first clutch member fixed to the housing, a second clutch member fixed to the transfer shaft, and an engagement member operable in a first mode to couple the third member of the planetary gearset to the first clutch member for establishing a reduced ratio drive connection between the rotor shaft and the transfer shaft and operable in a second mode to couple the third member of the planetary gearset to the transfer shaft for establishing a direct ratio drive connection between the rotor shaft and the transfer shaft; and
  a power-operated shift actuator for shifting the engagement member between the first and second modes,
  wherein actuation of the shift actuator to shift the engagement member from the first mode into the second mode causes acceleration of the second and third members of the planetary gearset and deceleration of the first member of the planetary gearset so as to synchronize the rotational speeds of the rotor shaft and the transfer shaft prior to establishment of the first mode.

14. The electric drive axle of claim 13 wherein the transfer shaft is located between the planetary gearset and the clutch assembly.

15. The electric drive axle of claim 14 wherein the gearbox further includes a drive shaft fixed for rotation with the third member of the planetary gearset, wherein the transfer shaft surrounds the drive shaft and has a first end coupled to the second member of the planetary gearset and a second end coupled to the second clutch member, and wherein the engagement member is coupled for rotation with the drive shaft and is moveable from a central disengaged position in a first direction into a first engaged position and from the disengaged position in a second direction into a second engaged position.

16. The electric drive axle of claim 15 wherein the engagement member is a shift sleeve, wherein the clutch assembly further includes a first synchronizer disposed between the shift sleeve and the first clutch member and a second synchronizer disposed between the shift sleeve and the second clutch member, wherein movement of the shift sleeve from the disengaged position toward the first engaged position causes the first synchronizer to brake rotation of the drive shaft and the third member of the planetary gearset prior to coupled engagement of the shift sleeve with the first clutch member, and wherein movement of the shift sleeve from the disengaged position toward the second engaged position causes the second synchronizer to increase the rotary speed of the transfer shaft and decrease the rotary speed of the rotor shaft prior to coupled engagement of the shift sleeve with the second clutch member.

17. The electric drive axle of claim 16 wherein the planetary gearset provides a mechanical advantage to the second synchronizer during movement of the shift sleeve from the disengaged position toward the second clutch member.

18. The electric drive axle of claim 16 wherein the planetary gearset includes a ring gear acting as the first member, a carrier acting as the second member, and a sun gear acting as the third member, and wherein the planetary gearset further includes pinion gears supported by the carrier and drivingly connecting the ring gear and the sun gear.

19. The electric drive axle of claim 16 wherein the planetary gearset includes a sun gear acting as the first member, a ring gear acting as the second member, and a carrier acting as the third member, and wherein the planetary gearset further includes pinion gears rotatably supported by the carrier and meshed with the ring gear and the sun gear.

20. The electric drive axle of claim 16 wherein the planetary gearset includes a carrier acting as the first member, a ring gear acting as the second member, and a sun gear acting as the third member, and wherein the planetary gearset further includes pinion gears rotatably supported by the carrier and drivingly connecting the ring gear and the sun gear.

* * * * *